United States Patent [19]

Simmons et al.

[11] Patent Number: 5,352,273
[45] Date of Patent: Oct. 4, 1994

[54] ALKYL SUBSTITUTED AROMATIC POLYESTER GAS SEPARATION MEMBRANES

[75] Inventors: John W. Simmons; Samuel D. Arthur, both of Wilmington, Del.

[73] Assignees: E. I. Du Pont de Nemours and Company, Wilmington, Del.; l'Air Liquide S.A., Paris, France

[21] Appl. No.: 45,782

[22] Filed: Apr. 14, 1993

[51] Int. Cl.$^5$ .................. B01D 53/22; B01D 71/48
[52] U.S. Cl. .......................... 95/45; 95/54; 96/4
[58] Field of Search ............... 95/45, 47–55; 96/4, 8, 10, 13; 210/500.23, 500.27, 500.28, 500.33

[56] References Cited

U.S. PATENT DOCUMENTS

| | | | |
|---|---|---|---|
| Re. 30,351 | 7/1980 | Hoehn et al. | 55/16 |
| 3,686,116 | 8/1972 | Rio | 210/500.33 X |
| 3,957,651 | 5/1976 | Kesting | 210/500.28 X |
| 4,607,070 | 8/1986 | Schreckenberg et al. | 210/500.33 X |
| 34,751,128 | 6/1988 | Portugall et al. | 528/193 |
| 4,822,382 | 4/1989 | Nelson | 55/16 |
| 4,840,646 | 6/1989 | Anand et al. | 95/54 |
| 4,851,014 | 7/1989 | Jeanes | 55/16 |
| 4,874,401 | 10/1989 | Jeanes | 55/16 |
| 4,892,912 | 1/1990 | Hayashi et al. | 525/437 |
| 4,900,334 | 2/1990 | Admassu et al. | 96/10 X |
| 4,923,947 | 5/1990 | Coassolo et al. | 528/193 |
| 4,946,926 | 8/1990 | Marshall et al. | 528/193 |
| 4,959,151 | 9/1990 | Nakatani et al. | 95/50 X |
| 4,963,266 | 10/1990 | Morgan et al. | 95/51 X |
| 4,964,890 | 10/1990 | Reuter et al. | 210/500.33 X |
| 4,978,739 | 12/1990 | Amone et al. | 528/271 |
| 4,981,897 | 1/1991 | Kawai et al. | 524/414 |
| 4,994,095 | 2/1991 | Kawakami et al. | 55/16 |
| 5,055,114 | 10/1991 | Kawakami et al. | 55/16 |
| 5,066,767 | 11/1991 | Matzner et al. | 528/193 |
| 5,071,942 | 12/1991 | Brewbaker et al. | 528/193 |
| 5,073,176 | 12/1991 | Arthur | 55/16 |
| 5,085,676 | 2/1992 | Ekiner et al. | 96/10 X |
| 5,089,594 | 2/1992 | Stern et al. | 528/194 |
| 5,141,530 | 8/1992 | Jensvold et al. | 55/16 |
| 5,152,811 | 10/1992 | Sanders, Jr. et al. | 55/16 |
| 5,178,649 | 1/1993 | Summers et al. | 95/47 |
| 5,209,848 | 5/1993 | Jeanes et al. | 95/49 X |

FOREIGN PATENT DOCUMENTS

| | | | |
|---|---|---|---|
| 62-247807 | 10/1987 | Japan | 210/500.33 |
| 1-009230 | 1/1989 | Japan | 210/500.33 |
| 1-252765 | 10/1989 | Japan | C23C 14/06 |

Primary Examiner—Robert Spitzer
Attorney, Agent, or Firm—Cary A. Levitt

[57] ABSTRACT

Novel alkyl-substituted aromatic polyester gas separation membranes and the process of using such membranes to separate one or more gases from a gaseous mixture is disclosed. The polyesters are formed from aromatic alcohols of the formula

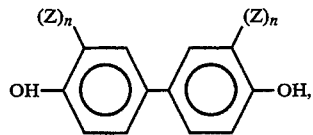

where Z is independently alkyl groups having 1 to 10 carbon atoms, most preferably a tertiary butyl group, n is an integer from 0 to 4, preferably 1.

6 Claims, No Drawings

ALKYL SUBSTITUTED AROMATIC POLYESTER GAS SEPARATION MEMBRANES

FIELD OF THE INVENTION

The present invention relates to aromatic polyester gas separation membranes and the process for separating one or more gases from a gaseous mixture using such membranes. The polyesters are derived from alkyl substituted aromatic alcohols. The inventive gas separation membranes exhibit exceptionally good permeation rates with good selectivity.

PRIOR ART

Aromatic polyesters, particularly polyesters made from alkyl-substituted aromatic alcohols, are known in the art. U.S. Pat. No. 4,923,947 describes a thermotropic liquid crystalline aromatic polyester formed from an alkyl-substituted diphenol. U.S. Pat. No. 4,978,739 describes a process for making a polyester from a dihydric phenol having the formula

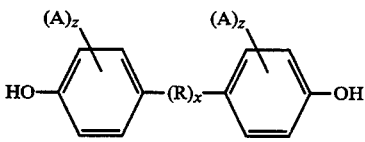

wherein A is independently selected from the group consisting of alkyl groups having 1 to 4 carbon atoms, chlorine or bromine, z is independently an integer from 0 to 4, inclusive, R is independently selected from the group consisting of divalent saturated hydrocarbon radicals having 1 to 8 carbon atoms, a cycloalkylene or cycloalkylidene radical having up to and including 9 carbon atoms, a phenyl radical, O, S, SO, $SO_2$, CO, and x is 0 or 1.

U.S. Pat. No. 4,981,897 describes an aromatic polyester film made, in part, from an alkyl-substituted dihydric phenol having the formula

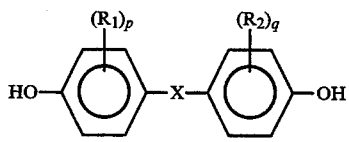

wherein $R_1$ and $R_2$ each represent the same or different alkyl groups having from 1 to 4 carbon atoms; p and q each represent the same or different integer of from 1 to 4; X represents a direct bond or X represents an alkylene group having from 1 to 10 carbon atoms, an alkylidene groups having from 2 to 20 carbon atoms, —O—, —S—, —$SO_2$— or

wherein hydrogen atoms of said alkyl group and said alkylidene group are optionally substituted by one or more hydrocarbon groups having from 1 to 20 carbon atoms, halogen atoms and halogenated hydrocarbon groups.

Japanese Patent Application 89-337254/46 describes an aromatic polyester film of high surface hardness made from an alkyl-substituted biphenol having the formula

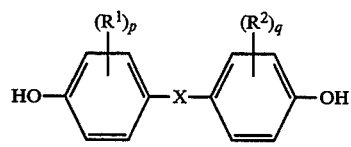

where $R^1$ and $R^2$ are 1-4 carbon alkyl or alkoxy, aryl, aryloxy; and p and q are integers from 1-4; and X is a direct bond, 1-10 carbon alkylene, cycloalkylidene, O, S, SO, $SO_2$ or CO.

Gas separation membranes made from polyesters are also known in the art. For example, U.S. Pat. No. 5,141,530 describes certain polyester gas separation membranes which have a plurality of pores having an effective average pore size in the range of up to about 500 Angstroms and have a non-ionic surfactant disposed on at least one surface of the membrane.

U.S. Pat. No. 5,073,176 describes polyester gas separation membranes derived from t-alkyl substituted isophthaloyl halide, in particular, 5-t-butylisophthaloyl chloride.

U.S. Pat. No. 4,994,095 describes gas separation membranes comprised of a polyester of 4,4'-(IH-alkylidene)-bis [2,3,6-trialkyl phenol] and aromatic dicarboxylic acids.

U.S. Pat. No. 4,822,382 describes a composite membrane with a separating layer comprised of at least one poly(tetramethyl) bisphenol A phthalate.

U.S. Pat. No. 5,055,114 describes permeable membranes comprised predominantly of specific defined tetrabromobisphenols and aromatic dicarboxylic acids.

U.S. Pat. No. 4,851,014 describes semipermeable membranes having a thin discriminating layer of bisphenolic polyester with a significant portion of the bisphenolic residues in the polymer backbone being based on tetrafluorobisphenol F.

U.S. Pat. No. 5,152,811 describes semipermeable gas separation membranes based upon uncross-linked polymers, including polyesters, containing bisphenol moieties.

U.S. Reissue Pat. No. 30,351 describes gas separation membranes made from aromatic polyesters in which the repeating unit of the polyester chain has at least one rigid divalent subunit, the two main chain single bonds extending from which are not colinear, is sterically unable to rotate 360° around at least one of these bonds and has 50% or more of its main chain atoms as members of aromatic rings.

The polyester membrane compositions of the prior art, although useful as gas separating membranes, not only suffer from the disadvantages of having to satisfy specific structural constraints, but are also difficult to fabricate into configurations such as hollow fiber membranes because these compositions tend to be soluble in relatively few solvents. Moreover, the membranes of the prior art tend to have relatively low flux. A need therefore exists for fluid separation membranes that avoid the fabrication and solubility problems of the prior art that also provide improved gas separation properties.

SUMMARY OF THE INVENTION

The present invention relates to certain alkyl-substituted aromatic polyester separation membranes particularly useful for separating gases and the process for using them. This class of membrane materials compositionally contain alcohols which incorporate alkyl substituted aromatic units, particularly alkyl substituted hisphenol. Membranes formed from this class of polyester materials exhibit superior gas permeability and good selectivity. It is believed that the high permeabilities of some gases from multicomponent mixtures is due to the molecular free volume in the polymer which is created by the alkyl substituents on the aromatic alcohols.

DETAILED DESCRIPTION OF THE INVENTION

The present invention relates to the discovery that gas separation membranes exhibiting exceptional gas permeability can be obtained by forming such gas separation membranes from polyesters, which incorporate alkyl-substituted aromatic alcohol having the structural formula

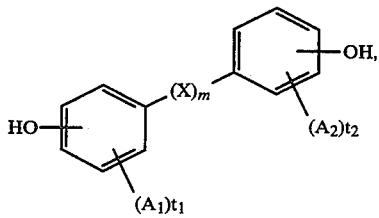

where $A_1$ and $A_2$ are independently —H, alkyl groups having 1 to 10 carbon atoms or aromatic groups having 6 to 12 carbon atoms, and $t_1$ and $t_2$ are independently an integer from 1 to 4 inclusive, and at least one of $A_1$ and/or $A_2$ is a tertiary butyl group; and

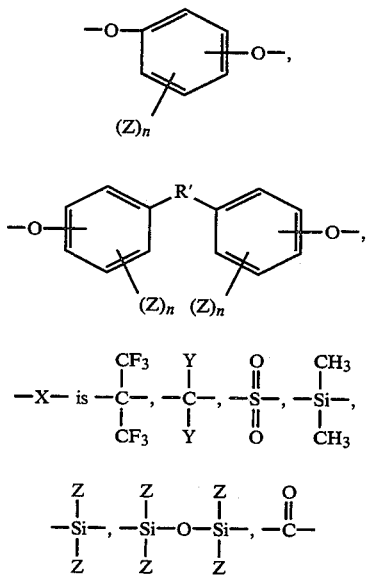

or mixtures thereof; where Z is independently alkyl groups having 1 to 10 carbon atoms, aromatic groups having 6 to 12 carbon atoms, preferably a tertiary butyl group; Y is independently alkyl groups having 2 to 10 carbon atoms; n is independently an integer from 0 to 4 inclusive, preferably 2; and m is 0 or 1, preferably 0. R' is

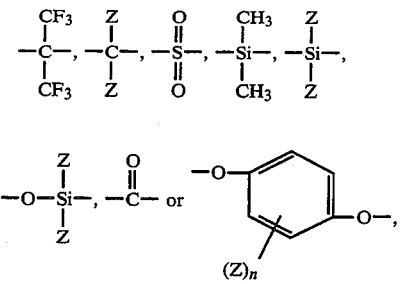

or mixtures thereof.

The alkyl-substituted aromatic alcohol of the present invention may be mixed with other aromatic alcohols.

The alkyl-substituted aromatic alcohol is by weight, preferably 10–100%, most preferably 50–100% of the total alcohol, and the other aromatic alcohol comprises preferably 0–90%, most preferably 0–50% of the total alcohol constituent.

Polyester separation membranes prepared from such alcohols possess an excellent balance of gas permeation rates and selectivities of one gas over other gases in a multicomponent gas mixture. The high gas permeability of these membranes is believed to be due to optimization of the molecular free volume in the polymer structure resulting from the incorporation of said alkyl-substituted aromatic alcohols in the polyester chain. In particular, it is believed that the alkyl substituents on the alcohol increase the molecular free volume of the polymer.

Generally, an inverse relationship between the gas permeation rate (flux) and the selectivity of the gas over other gases in a multicomponent gas mixture has been exhibited within polymer classes, such as polyesters, polyimides, polyamides and polyamide-imides. Because of this, prior art polyester gas separation membranes tend to exhibit either high gas permeation rates at the sacrifice of high gas selectivities or high gas selectivities at the sacrifice of high permeation rates. It would be highly desirable for gas separation membranes to exhibit high gas permeation rates while maintaining high gas selectivities.

The present invention circumvents the above shortcomings and provides exceptionally high permeation polyester gas separation membranes while maintaining good selectivity.

Polyester materials useful in the present invention are made from aromatic alcohols described above and aromatic diacid chlorides such as isophthaloyl chloride, terephthaloyl chloride, phenylindane dicarboxylic acid chloride, 5-t-butylisophthaloyl chloride, 4,4'-sulfonyldibenzoyl chloride or mixtures thereof. These diacid chlorides are not intended to be limiting as a wide variety of diacid chlorides may be used. Alternately, the free acid or ester or salt forms of the aromatic diacoyl compounds may be used to produce the polyester.

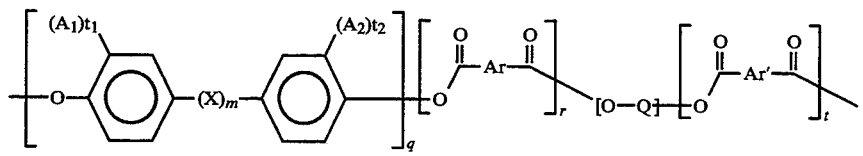

where X, $A_1$ $A_2$, $t_1$, $t_2$, m and n are defined above. Ar and Ar' are the same or different aromatic diacids and Q is an aromatic diol. q, r, s and p are fractions from 0 to 1 where q+s=1 and q is most preferably 0.5 to 1.0 and r+p=1.

In general, the polyesters of this invention have a weight average molecular weight within the preferred range of from about 10,000 up to about 1,000,000 and more preferably from about 50,000 up to about 200,000.

In the preferred process for preparing the polyester of this invention, approximately equimolar quantities of the alkyl-substituted aromatic alcohol and the diacid chlorides are reacted by well-established procedures known in the art, such as solution polymerization or interfacial polymerization. Melt polymerization may also be used.

The resulting polyester may then, if desired, be blended using conventional solution blending technology to yield a blend having specifically tailored properties.

The preferred polyester compositions of the present invention are soluble in a wide range of ordinary organic solvents including most amide solvents such as N-methyl pyrrolidone, and several chlorinated solvents such as dichloromethane and trichloromethane. This is a great advantage for the ease of fabrication of industrially useful gas separation membranes. To prepare membranes in accordance with this invention, the polymer solution is cast as a sheet onto a support, or spun through a cored spinneret to yield a hollow fiber. The solvent is then removed. For example, if a uniform membrane is desired, the solvent is evaporated by heating. On the other hand, if an asymmetric membrane is desired, the film or fiber structure is quenched in a liquid which is a nonsolvent for the polymer and a solvent for the organic solvent already present.

Gas separation membranes prepared from the polyester materials of the present invention possess an excellent balance of gas permeation rates and selectivities for one gas over other gases in a multicomponent gas mixture. Generally, prior polyester gas separation materials exhibit an inverse relationship between the gas permeation rate and the selectivity of said gas over other gases in a multicomponent gas mixture. The preferred materials of the present invention (Example 8) have been found to have a permeation rate for oxygen of 3.69 Barrer while maintaining a good oxygen/nitrogen selectivity of 6.55.

The polyesters described in this invention also have high inherent thermal stabilities. They are generally stable up to 400° C. in air or inert atmospheres. The glass transition temperatures of these polyesters are generally above 175° C. The high temperature characteristics of these compositions can help to prevent the membrane compaction problems observed in other polymers at even moderate temperatures.

The polyester membranes disclosed herein have found use in gas separations. The present invention finds use in the enrichment of oxygen and nitrogen from air for increased combustion or inerting systems, respectively; in recovery of hydrogen in refinery and ammonia plants; separation of carbon monoxide from hydrogen in syngas systems; and separation of carbon dioxide or hydrogen sulfide from hydrocarbons.

The permeability of gasses through membranes is defined as the Barrer (B).

$$1 \text{ Barrer} = \frac{10^{-10} \text{ cm}^3 \text{ (STP)} \times \text{cm.}}{\text{cm}^2 \times \text{sec.} \times \text{cm. Hg.}}$$

wherein
  $cm^3$/sec (STP) is the flux (flow rate) in units volume per seconds of permeated gas at standard temperature and pressure,
  cm. is the thickness of the film,
  $cm^2$ is the area of film, and
  cm. Hg is the pressure (or driving force).

The selectivity of a membrane in separating a two component fluid mixture is defined as the ratio of the rate of passage of the more readily passed component to the rate of passage of the less readily passed component. Selectivity may be obtained directly by contacting a membrane with a known mixture of gasses and analyzing the permeate. Alternatively, a first approximation of the selectivity is obtained by calculating the ratio of the rates of passage of the two components determined separately on the same membrane. Rates of passage may be expressed in Barrer (B) units. As an example of selectivity, a $O_2/N_2=10$ indicates that the subject membrane allows oxygen gas to pass through at a rate 10 times that of nitrogen.

The invention will now be further illustrated by way of the following Examples, which are considered to be illustrative only, and non-limiting.

EXAMPLES

General Solution Polymerization Procedure

The polyesters of Examples 1-7 were prepared by solution polymerization as follows: A 3-necked round-bottomed flask equipped with a mechanical stirrer and a nitrogen inlet was charged with the diol(s) identified in Table 1 (1 equivalent), triethylamine (5.0 equivalents), and methylene chloride and cooled in an ice bath to around 0° C. Then the diacoyl chloride(s) identified in Table 1 (1 equivalent), dissolved in methylene chloride was added dropwise. After the addition was complete, the ice bath was removed and the reaction mixture was allowed to warm to room temperature and stir overnight under nitrogen. The polymer was precipitated into methanol and ground up in a blender, washed with methanol (2 times) and air dried overnight. The polymer was further dried in a vacuum oven at 100° C. for 2 hours.

General Interfacial Polymerization Procedure

The polyesters of Examples 8-15 were prepared by interfacial polymerization, as follows: The reactions are carried out in a commercial blender on low speed. The sodium hydroxide (2.2–2.3×moles of diol(s)) identified in Table 1 is dissolved to make an approximately 3% aqueous solution. A phase transfer catalyst, usually a quaternary ammonium salt such as benzyl triethyl ammonium chloride (roughly 0.1×moles of diol(s)), is added to the aqueous solution followed by the diol(s). This mixture is allowed to stir in the blender for about 15 minutes under low speed. The diacid chloride(s) identified in Table 1 (used equimolar amount of diacid chlorides to diols) are dissolved in methylene chloride (used roughly the same volume of $CH_2Cl_2$ as water) and then added slowly to the aqueous solution. The two-phase reaction mixture is allowed to stir in the blender for about 10–15 minutes. The excess aqueous phase is then decanted off and methanol is added to the mixture to precipitate the polymer. The mixture is blended sufficiently to break up the polymer into flake and then filtered. The polymer flake is washed with methanol then air dried at room temperature overnight. The polymer is then further dried in a vacuum oven at 100° C. for 2 hours.

General Film Forming Procedure

A film of each of the above polyesters was cast from a 10 to 20% by weight N-methylpyrrolidone solution onto a glass plate at 120° C. with a 15-mil ($38 \times 10^5$ m) knife gap. The film was dried on the plate at 120° C. for 60–90 minutes and then removed from the plate. The film was air dried overnight. The film was then further dried in a vacuum oven (2.67 kPa) at 230° C. for 18 hours.

The above films (film thicknesses=1–2.5 mils) were tested for oxygen permeability and mixed gas oxygen/nitrogen (21/79 mole ratio) permeabilities at 500 psig ($34.5 \times 10^{-5}$ Pa) at 25° C. The results are reported in Table 1.

What is claimed is:

1. A gas separation membrane formed from an aromatic polyester comprising:
(a) moieties derived from a diol wherein 0–90% is any diol moiety and 10–90% is an aromatic diol moiety diol having the following formula:

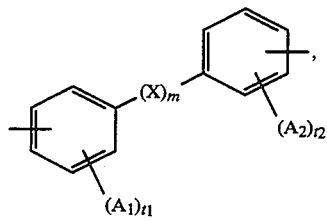

where $A_1$ and $A_2$ are independently —H, alkyl groups having 1 to 10 carbon atoms or aromatic groups having 6 to 12 carbon atoms, and $t_1$ and $t_2$ are independently an integer from 1 to 4 inclusive, and at least one of $A_1$ and/or $A_2$ is a tertiary butyl group; and

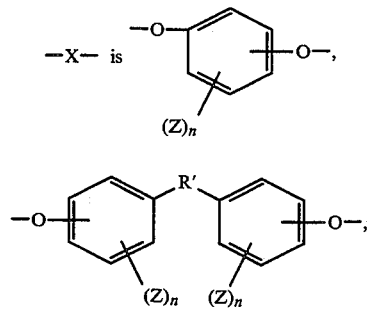

TABLE 1

| Example | Diol 1 (a) | Diol 2 (b) | Mole % (a)/ Mole % (b) | Diacid 1 (c) | Diacid 2 (d) | Mole % (c)/ Mole % (d) | IV | $P_{O2}(B)$ | $P_{O2}/P_{N2}$ |
|---|---|---|---|---|---|---|---|---|---|
| 1 | A | — | 100 | Y | X | 70/30 | 1.10 | 3.34 | 5.94 |
| 2 | A | — | 100 | W | — | 100 | 0.44 | 5.00 | 5.93 |
| 3 | K | — | 100 | V | — | 100 | 0.77 | 23.00 | 4.21 |
| 4 | K | — | 100 | Y | X | 70/30 | 0.83 | 4.20 | 4.98 |
| 5 | J | — | 100 | V | — | 100 | 1.20 | 19.00 | 4.18 |
| 6 | J | — | 100 | Y | X | 70/30 | 1.28 | 3.10 | 4.78 |
| 7 | A | I | 10/90 | V | — | 100 | 1.90 | 2.20 | 6.57 |
| 8 | A | C | 50/50 | Y | X | 70/30 | 0.79 | 3.69 | 6.55 |
| 9 | A | D | 50/50 | Y | X | 70/30 | 0.94 | 0.96 | 6.03 |
| 10 | A | E | 75/25 | Y | X | 70/30 | 0.97 | 3.17 | 6.04 |
| 11 | A | E | 50/50 | Y | — | 100 | 0.70 | 3.11 | 5.94 |
| 12 | A | F | 50/50 | Y | X | 70/30 | 0.57 | 1.71 | 6.34 |
| 13 | A | G | 75/25 | Z | U | 50/50 | 0.66 | 4.31 | 5.74 |
| 14 | A | H | 75/25 | Y | X | 70/30 | 1.23 | 3.03 | 6.12 |
| 15 | A | H | 75/25 | Y | — | 100 | 1.01 | 2.58 | 6.43 |

Legend
A = 3,3'-Di-t-butyl-4,4'-dihydroxybiphenyl (DBBP)
C = Tetramethylbisphenol A (TMBPA)
D = Dimethylbisphenol A (DMBPA)
E = Bisxylenol P (BXP)
F = Bisphenol AP (BPAP)
G = Spirobisindanol (SBID)
H = 9,9'-Bis(4-hydroxyphenyl)fluorene (BHPF)
I = Resorcinol (Res)
J = 4,4'-dihydroxy-3,3',5,5'-tetramethylbiphenyl (TMBP)
K = 4,4'-dihydroxy-2,2',3,3',5,5'-hexamethylbiphenyl (HMBP)
Z = (70/30) mixture of isophthaloyl/terephthaloyl chloride (I/T)
Y = Isophthaloyl chloride (I)
X = Terephthaloyl chloride (T)
W = Phenylindane dicarboxylyic acid chloride (PIDC)
V = 5-t-Butylisophthaloyl chloride (BIPC)
U = 4,4'-sulfonyldibenzoyl chloride (SDBC)

-continued

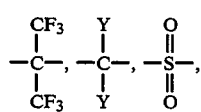

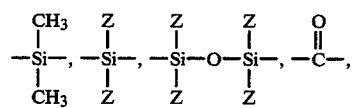

or mixtures thereof; where Z is independently —H, alkyl groups having 1 to 10 carbon atoms, aromatic groups having 6 to 12 carbon atoms; Y is independently alkyl groups having 2 to 10 carbon atoms; n is independently an integer from 0 to 4 inclusive; m is 0 or 1; and R' is

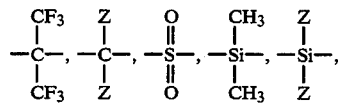

-continued

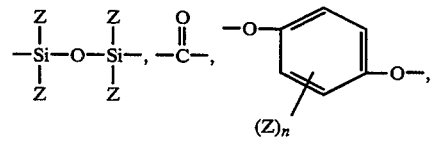

or mixtures thereof; and (b) moieties derived from an aromatic diacid chloride or the free acid, ester or salt forms of the aromatic diacid chloride.

2. The membrane of claim 1 where $A_1$ and $A_2$ each are a tertiary butyl group, t=1 and m=0.

3. The membrane of claim 1 wherein the diacid chloride is selected from the group of isophthaloyl chloride, terephthaloyl chloride, phenylindane dicarboxylic acid chloride, 5-t-butylisophthaloyl chloride or 4,4'-sulfonyldibenzoyl chloride or mixtures thereof.

4. The membrane of claim 3 wherein the diacid chloride is selected from the isophthaloyl chloride or terephthaloyl chloride or mixtures thereof.

5. The membrane of claim 1 wherein the aromatic diol is selected from the group of 3,3'-di-t-butyl-4,4'-dihydroxy biphenyl.

6. A process for separating one or more gases from a gaseous mixture comprising bring said gaseous mixture into contact with a first side of the gas separation membrane of claims 1 to 5 in a manner to cause a portion of the mixture to pass through the membrane to a permeate side, the resulting gas mixture on the permeate side being enriched in one or more component over that of the mixture on the first side.

* * * * *